United States Patent

[11] 3,631,471

[72] Inventor John Michael Griffiths
Hillingdon, England

[21] Appl. No. 882,938
[22] Filed Dec. 8, 1969
[45] Patented Dec. 28, 1971
[73] Assignee The Post Office
London, England
[32] Priority Dec. 13, 1968
[33] Great Britain
[31] 59,503/68

[54] LOW DISPARITY BINARY CODES
13 Claims, 4 Drawing Figs.

[52] U.S. Cl. .......... 340/347 DD, 235/154
[51] Int. Cl. .......... H04l 3/00
[50] Field of Search .......... 340/347, 146.1; 235/154

[56] References Cited

UNITED STATES PATENTS

| | | | |
|---|---|---|---|
| 3,526,759 | 9/1970 | Clapper .......... | 340/347 DD |
| 3,181,136 | 4/1965 | Lambourn .......... | 340/347 DD |
| 3,300,774 | 1/1967 | Chatelon .......... | 340/347 DD |
| 3,123,816 | 3/1964 | Schramel .......... | 340/347 DD |

*Primary Examiner*—Daryl W. Cook
*Assistant Examiner*—Jeremiah Glassman
*Attorney*—Hall & Houghton

ABSTRACT: A method and apparatus for recoding a sequence of binary digits into a form having lower disparity for transmission and the transformation of the data back into its original form are described. In recoding, successive groups of *n* binary digits are recoded as groups of *m* binary digits, where *m* is greater than *n*, and both are positive integers. Recoding is arranged so that some but not all of the groups of *m* digits have minimum disparity and successive groups of *m* digits having nonzero disparity have disparities of opposite signs. Preferably, *m* equals *n* +1 and is even, each of the *m* digit groups having zero disparity being derived from a respective one of the $^{m}C_{m/2}$ of the groups of *n* digits having unit disparity by the addition at a predetermined position in that group of one extra digit of the appropriate type to produce zero disparity.

Figure 1:
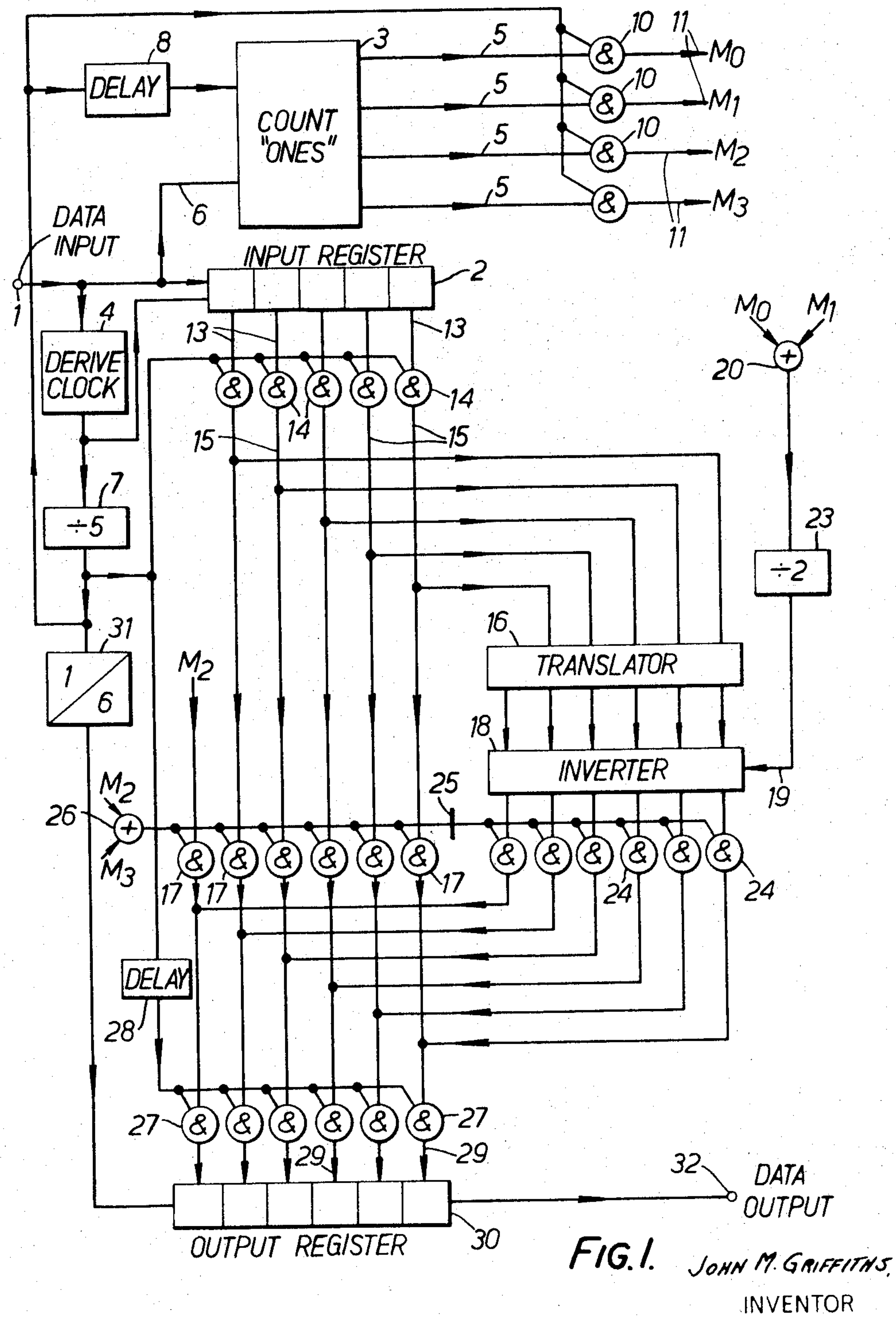

JOHN M. GRIFFITHS,
INVENTOR

BY [signature]
ATTORNEY

JOHN M. GRIFFITHS,
INVENTOR

BY Hall & Houghton
ATTORNEY

JOHN M. GRIFFITHS
INVENTOR

BY Hall & Houghton
ATTORNEY

LOW DISPARITY BINARY CODES

This invention relates to the translation of binary data into and from a form having lower disparity, and has particular, but not exclusive, reference to the transmission of binary data over a regenerative repeatered line.

In pulse transmission systems, in particular multichannel pulse code modulation systems, it is usual to insert digital regenerative repeaters at regular intervals in the signal transmission path, these being power-fed over the transmission path. For this reason, and also because the path may be a balanced pair and the repeater unbalanced, and for other reasons, it is convenient to insert a transformer at the signal input and elsewhere in the repeater. In consequence, the DC component of the signal is lost. All the problems of a "wandering zero" well known in telegraphy and data transmission, have therefore to be faced. DC restoration circuits are an undesirable complication, and the alternative of arranging that the line signal contains little or no energy at zero or very low frequencies is usually preferred. This latter method requires restrictions to be imposed on the maximum number of consecutive digits of the same type which are transmitted, and the excess of digits of one polarity over those of the other, that is, the disparity of the data. Accordingly, if it is required to transmit an unrestricted digital signal, it must first be encoded into a more suitable form.

It is an object of the invention to provide a means for translating binary data into or from a form having a lower disparity and small numbers of consecutively repeated digits of the same type.

According to the invention there is provided a method or apparatus for transforming a sequence of binary digits into a form having lower disparity, wherein successive groups of $n$ binary digits in the sequence are recoded as groups of $m$ binary digits, where $m$ is greater than $n$, and both are positive integers, in which the code is arranged so that some but not all of the groups of $m$ digits used in the recoding have minimum disparity and successive groups of $m$ digits having nonzero disparity have disparities of opposite signs. The invention also includes a method or apparatus for decoding the low disparity groups of digits so produced.

The term "disparity" of a sequence or group of binary digits is used to mean the excess of digits of one kind over digits of the other kind within the sequence or group. If the number of digits of one kind is equal to the number of digits of the other kind the disparity is zero, but if the one or the other kind of digit predominates the sequence or group has a nonzero disparity. The "sign" of the disparity is determined by which kind of digit predominates, thus a group in which "O's" predominate has a disparity of opposite sign to a group in which "1's" predominate. "Low disparity" is used to mean a disparity whose modulus is relatively small, that is, low unsigned disparity. The term "minimum disparity" refers to the "lowest" disparity which a group of digits can have, that is, minimum unsigned disparity. If a group contains an even number of digits the minimum disparity is zero and if it contains an odd number the minimum disparity is unit disparity.

According to a feature of the invention the code is arranged to exclude groups of $m$-digits having large numbers of repeated digits.

In the general case, where $n$-digit groups are translated into $m$-digit groups ($m$ greater than $n$, both positive integers) the recoding is carried out as follows:

for $m$ even:

${}^{m}C_{m/2}$ of the $2^{n}$ possible $n$-digit groups, ${}^{m}C_{m/2}$ being less than $2^{n}$, are recoded into $m$-digit groups of zero disparity and the remaining $n$-digit groups are recoded as $m$-digit groups of alternate positive and negative disparities.

for $m$ odd:

All the $2^{n}$ $n$-digit groups are recoded into $m$-digit groups of alternate positive and negative disparities. In both cases the code is chosen to keep the number of consecutive digits of the same type low.

It will be appreciated that the values of $m$ and $n$, and the difference between their values will affect the performance of the system and the complexity of the equipment needed to realize it. For example, if $m$ is very much greater than $n$ there is an undesirable decrease in information rate for a given bandwidth. If $m$ and $n$ are both large and $m/n$ is nearly one, the code is required to include $m$-digit groups of large disparity, and the techniques of alternating positive and negative disparities is less successful. In general, more equipment is needed for $m$ odd than for $m$ even, and the larger the values of $m$ and $n$ the more complex the equipment becomes. A detailed description of a system for which $n=5$ and $m=6$, and a coding table for $n=3$ and $m=4$ are given below.

Figure 2:
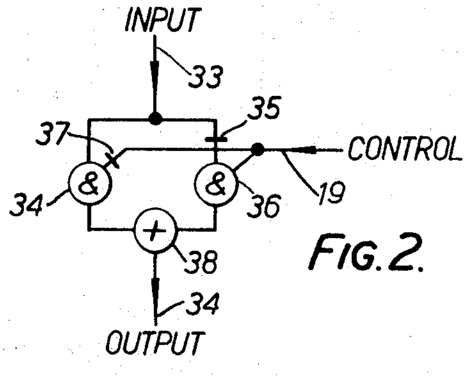
Figure 3:
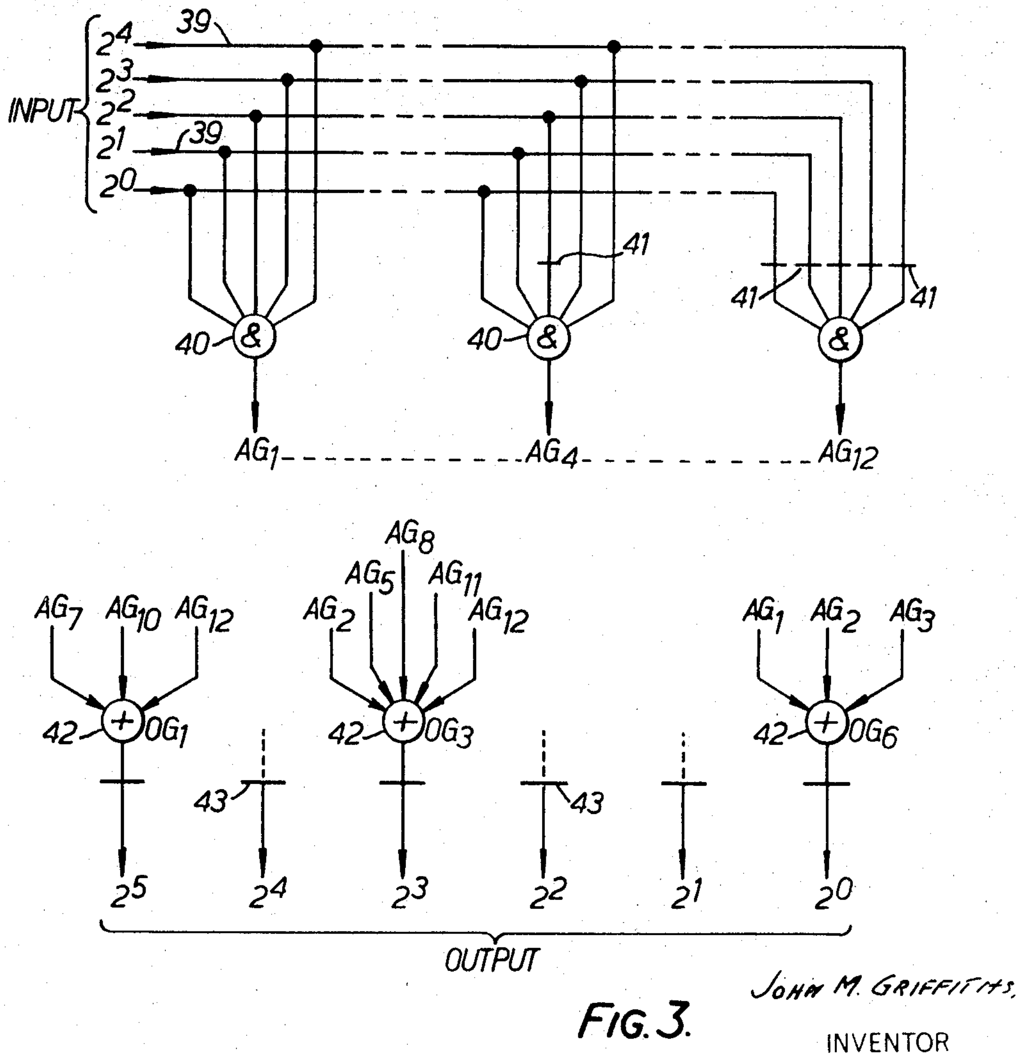
Figure 4:
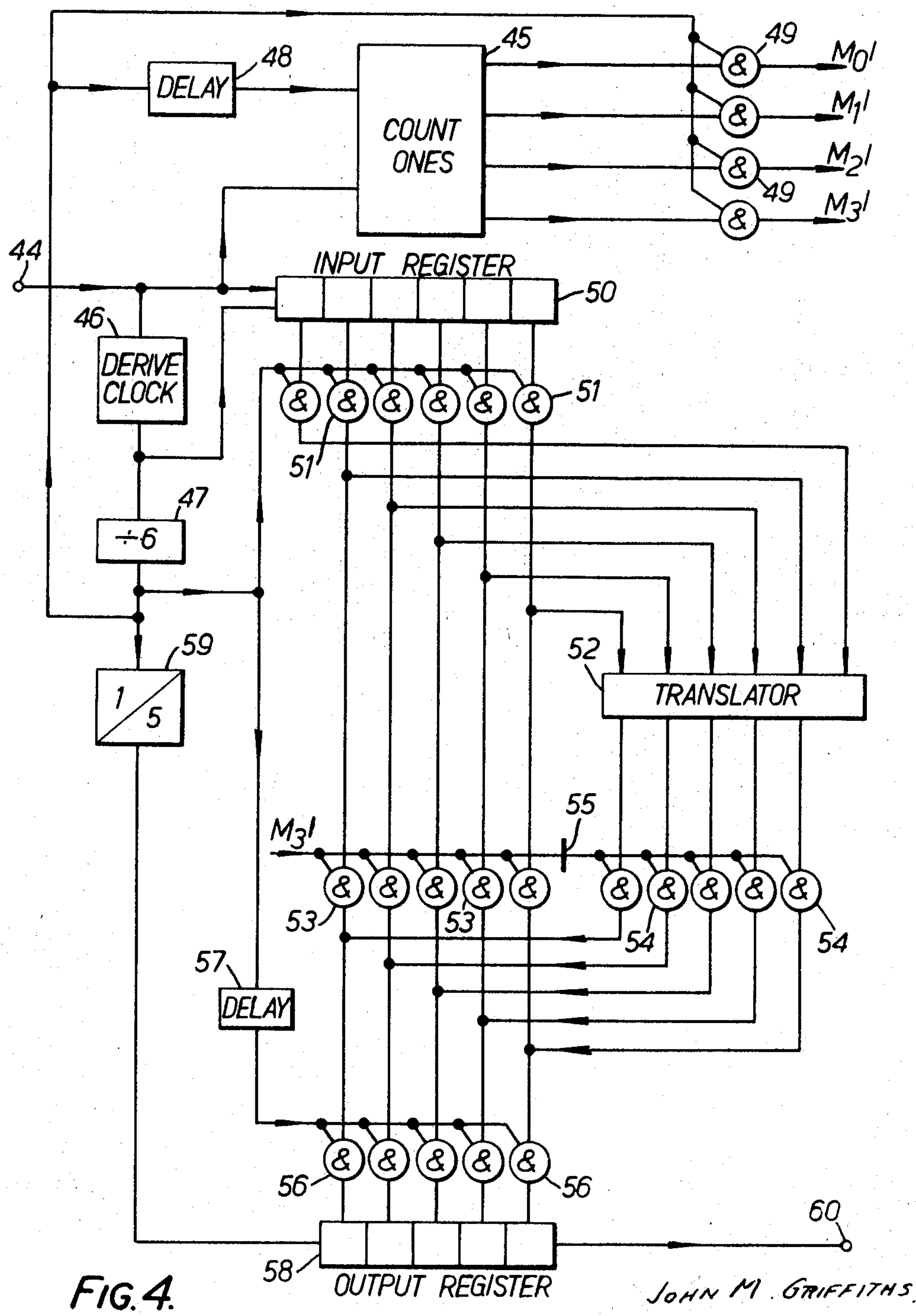

In order that the invention may be fully understood and readily carried into effect one embodiment of it will now be described with reference to the accompanying drawings of which:

FIG. 1 shows an encoder-transmitter according to this embodiment of the invention where $n=5$ and $m=6$, FIG. 2 shows one channel of a controlled inverter used in the encoder-transmitter of FIG. 1, FIG. 3 shows part of a translator used in the encoder-transmitter of FIG. 1, and FIG. 4 shows a receiver-decoder for use with the encoder-transmitter of FIG. 1.

FIG. 1 shows an encoder-transmitter which converts a "raw" binary data input into a coded output of low disparity with few consecutively repeated digits. The encoder-transmitter examines the "raw" binary data in five-digit groups and recodes each group of five digits into a new group of six-digit length. For the purpose of recoding no reference is made to any word and/or frame structure in the raw data, that is the encoder examines consecutive five-digit groups regardless of whether they contain synchronization or error detection bits. Thus the "raw" data is accepted by the encoder-transmitter as a continuous train of binary digits.

Table 1 shows the code used in the encoder-transmitter.

TABLE 1

| 5-digit group | 6-digit group | complement (nonzero disparity) |
|---|---|---|
| 11000 | 110001 | |
| 10100 | 101001 | |
| 10010 | 100101 | |
| 10001 | 100011 | |
| 01100 | 011001 | |
| 01010 | 010101 | |
| 01001 | 010011 | |
| 00110 | 001101 | |
| 00101 | 001011 | |
| 00011 | 000111 | |
| 00111 | 001110 | |
| 01011 | 010110 | |
| 01101 | 011010 | |
| 01110 | 011100 | |
| 10011 | 100110 | |
| 10101 | 101010 | |
| 10110 | 101100 | |
| 11001 | 110010 | |
| 11010 | 110100 | |
| 11100 | 111000 | |
| 11111 | 111010 | 000101 |
| 11110 | 110110 | 001001 |
| 11101 | 101110 | 010001 |
| 11011 | 111001 | 000110 |
| 10111 | 110101 | 001010 |
| 01111 | 101101 | 010010 |
| 10000 | 011011 | 100010 |
| 01000 | 110011 | 001100 |
| 00100 | 101011 | 010100 |
| 00010 | 011011 | 100100 |
| 00001 | 100111 | 011000 |
| 00000 | 010111 | 101000 |

In this code the 25-digit groups of unit disparity are mapped onto the set of 20 six-digit groups of zero disparity by the addition of a one or zero digit as required. The remaining 12 five-digit groups are mapped alternately into the sets of 15 six-digit groups of disparity +2 and −2 respectively. The three six-digit groups in each set of 15 which are not used are those which contain four consecutive digits of the same type. The alternative mappings of each of the 12 five-digit groups having a disparity of −3 or ±5 are complements of one another — a feature which allows the use of a small capacity translator, although there may be other mappings which have the same advantage. Thus in this coding where possible the five-digit groups have been coded into six-digit groups of zero disparity, where this is not possible they have been coded into six-digit groups of disparity ±2 in which the positive and negative disparities forms are used alternately. An example will make the method of coding clear, suppose the "raw" data contains: .....00000000001111111111...., then this would be examined as .....00000–00000–11111..... and coded:

00000 becoming 010111 positive disparity
00000 becoming 101000 negative disparity
11111 becoming 111010 positive disparity
11111 becoming 000101 negative disparity The total recoded signal is thus:

.....010111101000111010000101.....

In comparison with the "raw" data it will be noted that the recoded data is in a much improved form for transmission over a regenerative repeatered line.

It will be appreciated that the coding just described is only one example of a suitable coding and many other suitable codes are possible. It is most likely, however, that in all of the suitable codes the six groups of six binary digits having five or more digits of the same type or having a group of four digits of the same type would be excluded as in the above example.

The apparatus shown in FIG. 1 converts "raw" binary data into a recoded form according to table 1.

Referring now to FIG. 1, "raw" binary input data is supplied to the encoder-transmitter at an input point 1, from where it is fed to an input register 2, a "ones" counter 3, and a clock-pulse deriving unit 4. The ones-counter 3 may conveniently be a modulo four counter, having four outputs 5, corresponding respectively to 0 or 4, 1 or 5, 2 and 3, "ones" in the five-digit group examined and an input 6 for the input data. To enable the ones-counter 3 to operate on five-digit groups, it is controlled by pulses from the clock-pulse unit 4 divided in frequency by five by divider 7 and applied via delay 8 to reset the counter 3 after each group. Each of the four outputs 5 of the ones-counter 3 is connected to one input of a respective AND-gate 10. The four AND-gates 10 have outputs 11 reference $M_0$, $M_1$, $M_2$, $M_3$, corresponding to 0 or 4, 1 or 5, 2 and 3 "one" digits in the five-digit groups respectively. The "ones" count is used to effect the gating in different parts of the apparatus so as to effect automatically the changeover in the method of coding depending on whether the six-digit group is of zero disparity or not.

The AND-gates 10 are controlled by pulses from the divider 7. The input register 2 has five outputs 13 each of which is connected to a respective AND-gate 14 controlled by the output of the divider 7. Each AND-gate 14 has an output 15 which is connected to a respective channel of a translator 16 and one input of an AND-gate 17. There are six AND-gates 17, five of which are connected to the outputs 15 of the gates 14 and the sixth of which receives signal $M_2$ from the "ones" counter 3 via a gate 10. The translator 16 is wired to function according to the code of table 1 and may be in the form of a diode matrix. The translator 16 recodes those five-digit groups which cannot be formed into a six-digit group of zero disparity. The output of the translator 16 is connected to a controlled complementor or inverter 18, the function of which is to invert alternate six-digit groups of nonzero disparity. The inverter 18 is controlled by a signal on conductor 19, which is obtained by applying outputs $M_0$ and $M_1$ (11) via an OR gate 20 to a divide by two unit 23.

Each of the six output channels of the inverter 18 is connected to a respective two-input AND-gate 24 controlled by signals $M_2$ and $M_3$ via OR gate 26 and inverter 25. The $M_2$ and $M_3$ signals combined by gate 26 are also connected to control the AND-gates 17. The respective outputs of the AND-gates 17 and the AND-gates 24 are connected together at the inputs of a set of AND-gates 27, controlled by pulses from divider 7 connected via delay 28. The AND-gates 27 have outputs 29 which are connected to respective stages of an output shifting register 30. Since the recoded data has 6/5 as many digits as the data before recoding the output register is controlled by clock-pulses of 6/5 times the frequency of the clock-pulses from the clock-pulse deriving block 4 produced by multiplying the frequency of repetition of pulses from the divider 7 by a factor of six in a frequency multiplier 31. The contents of the output register 30 are shifted out under the control of pulses from multiplier 31 and applied to output terminal 32 from which the recoded data is transmitted.

Although the methods for multiplying and dividing the frequency of pulses are well known, a brief description of one method of multiplying by such factors as 6/5 suitable for use in the above-described circuit will be given.

To obtain a frequency $6f/5$ from a starting frequency $f$, the frequency $f$ is first divided by five. This may be accomplished by a digital divider circuit. The square-wave output of the frequency divider is filtered by a band-pass filter to obtain a sine wave of frequency $f/5$. A frequency of $2f/5$ is obtained by full-wave rectification using a bridge rectifier and an isolating transformer. The $2f/5$ frequency is filtered to obtain a sine wave of frequency $2f/5$. A waveform rich in odd harmonics is obtained by squaring the $2f/5$ sine wave, a Schmitt trigger circuit is suitable for this purpose. The harmonic corresponding to $6f/5$ is obtained by means of a band-pass filter tuned to that frequency. The output of the filter is squared to obtain the desired square wave of frequency $6f/5$.

One channel of the controlled inverter 18 is shown in FIG. 2. It has a data input 33, and output 34 and a control input 19. The channel contains two AND-gates 34, 36, two inverters 35, 37 and an OR-gate 38. The input 33 is connected to one input of the AND-gate 34 and via the inverter 35 to an input of AND-gate 36. The control input signal 19 is connected to the remaining input of the AND-gate 36 and via the inverter 37 to the remaining input of gate 34. The outputs of the AND-gates 34, 36 are each taken to one input of the OR-gate 38. The output of the OR-gate 38 is the output 34 of the one channel of the controlled inverter 18. A digit applied at the input 33 will appear in inverted or noninverted form at the output 34 depending on whether a one or a zero signal is applied to the control input 19.

FIG. 3 shows part of the translator 16 which contains a set of 12 five-input AND-gates 40 (AG1 to AG12), six multiinput OR-gate 42 (OG1 to OG6) and inverters 41, 43 to obtain the desired logic functions of the code table. There are five input lines 39 each for a respective digit of the five-digit group, the lines corresponding to $2^0$, $2^1$ etc. are marked. Each of the AND-gates 40 has each of its inputs connected directly or via an inverter 41 to an associated one of the input channels 39. Inverters 41 are added to the inputs of the AND-gates 40 so that each of the gates 40 responds to a respective one of the 12 five-digit groups as set out in table 1. The outputs of AND-gates 40 are selectively connected to the inputs of OR-gate 42 so as to cause the production of the output codes according to table 1. The outputs of the OR-gates 42 are inverted by inverters 43. For simplicity only three AND gates and three OR gates have been shown in FIG. 3 but in practice 12 AND gates and six OR gates are required.

FIG. 4 shows a receiver-decoder for use at the far end of a transmission link fed by the encoder-transmitter of FIG. 1. The receiver-decoder as shown in similar in construction to the transmitter-encoder shown in FIG. 1, and translates the received six-digit groups of positive and negative disparity individually. It would of course be possible to employ a receiver which detected the disparity beforehand and selectively inverted one set of 12 six-digit groups. Such a receiver would require a translator with an input capacity of only 12 six-digit groups compared with the receiver shown which requires 24 six-digit group capacity. The signals from the transmitter are received at an input point 44 and are applied to "ones" counter 45 and clock-pulse deriving unit 46. A "ones" counter 45 counts the number of "ones" in each six-digit group and is controlled by pulses derived from clock-pulses from the clock-pulse deriving unit 46 by frequency division by six in divider 47, the pulses being delayed by delay unit 48 which resets the counter 45 after each group of six digits. The outputs of the "ones" counter 45 are taken to a set of four AND-gates 49 controlled by pulses from divider 47 to produce outputs referenced $M'_0$, $M'_1$, $M'_2$, and $M'_3$, corresponding respectively to 0 or 4, 1 or 5, 2 or 6 and 3 "ones" in the six-digit group examined. The counter 45 and associated components could be replaced in this example by a modulo two-counter, such as a divide by two circuit, and a "1" output from this counter would indicate no existence of three 1's in a group; although both a single "1" and five 1's could produce the same result, these should not occur during normal operation. Signals from the input point 44 are also taken to an input register 50. The outputs of the input register 50 are passed via a set of AND-gates 51 controlled is pulses from divider 47 to a translator 52 and also to a set of AND-gates 53 which are controlled by the signal $M'_3$. The translator 52 (which may be designed in a similar manner to that shown in FIG. 3) converts the six-digit groups of nonzero disparity into the corresponding five-digit groups. The output of the translator 52 is taken to a set of AND-gates 54 which are controlled by an inverted $M'_3$ signal from an inverter 55. The outputs of the AND-gates 53 and the AND-gates 54 are combined in pairs and connected to respective AND-gates 56 controlled by pulses from divider 47 delayed by a delay unit 57. The outputs from the AND-gates 56 are connected to an output shifting register 58. The contents of the output register 58 are shifted out by pulses derived from the divider 47, after frequency multiplication in multiplier 59 which multiplies frequency by five. The output of the shift register is taken to an output point 60. Data fed into the transmitter at point 1 (FIG. 1) thus reappears in its original form at the receiver output point 60 (FIG. 4). The decoder is aligned by examining each incoming group for four consecutive digits of the same type. This can only occur by the conjoining of the last and first parts of two successive groups and the detection of four of such in 64 consecutive groups would indicate loss of alignment of the decoder. When such a loss of alignment occurs the clock unit 46 is shifted by one pulse to reduce by one the number of consecutive digits of the same type in a group of six in an attempt to realign. This shifting would be repeated until alignment is achieved as indicated by the above criterion.

The arrangement described above has the merits that in the transmitted form of the data there are never more than six consecutive digits of the same type, the disparity is never more than five, there is only a 20 percent increase in modulation rate and binary form is retained.

The invention may be applied to an $n$=3, $m$=4 system although the increase in modulation rate is greater. A code for use in this system is shown in table 2.

TABLE 2

| 3-digit group | 4-digit group | inversion (for nonzero disparity) |
|---|---|---|
| 001 | 0011 | |
| 010 | 0101 | |
| 100 | 1001 | |
| 110 | 1100 | |
| 101 | 1010 | |
| 011 | 0110 | |
| 111 | 1101 | 0010 |
| 000 | 1011 | 0100 |

Similarly seven-digit groups may be recoded as eight-digit groups but use would have to be made of quadruple disparity eight-digit groups to provide sufficient translations, and a simple alternate disparity inversion process would be less successful than in the case of 5 to 6 digit coding.

It will be appreciated that many alternative embodiments are possible within the scope of the invention. For example, the invention is not restricted to the use with regenerative repeatered lines.

I claim:

1. A method for transforming a sequence of binary digits into a form having lower disparity, the method including the steps of selecting successive groups of $n$ binary digits in the sequence, recoding each group as a group of $m$ binary digits, where $m$ is greater than $n$, and both are positive integers, in such a way that some but not all of the groups of $m$ digits used in the recoding have minimum disparity and that each group of $n$ digits which is recoded as a group of $m$ digits having nonzero disparity is also recoded as an alternative group of $m$ digits having a disparity of the same magnitude but opposite sign, and selecting the groups so that successive groups of $m$ digits having nonzero disparity have disparities of opposite signs.

2. A method according to claim 1, in which $m$ is even and ${}^{m}C_{m/2}$ is less than $2^n$, including the step of recoding ${}^{m}C_{m/2}$ of the $2^n$ possible different groups of $n$ digits into different $m$-digit groups of zero disparity and recoding the remaining different groups of $n$ digits as different $m$-digit groups having alternative positive and negative disparities.

3. A method according to claim 2, in which $m$ equals $n+1$, including the step of deriving each of the $m$ digit groups having zero disparity from a respective one of the ${}^{m}C_{m/2}$ of the groups of $n$ digits having unit disparity by adding at a predetermined position in that group one extra digit of the appropriate type to produce zero disparity.

4. A method according to claim 3, including the step of recoding each of the remaining groups of $n$ digits into a selected one of two $m$-digit groups, of which one group is complementary to the other, and the selection is made in dependence upon the disparity required.

5. A method according to claim 2 in which $n$=5 and $m$=6.

6. A method of transforming a sequence of binary digits from a form having lower disparity and produced by a method according to claim 3, including the steps of selecting successive groups of $m$ digits, ascertaining the disparity of each group, transforming each group of $m$ digits of zero disparity into a group of $n$ digits by removing the extra digit from the predetermined position, and transforming each group of $m$ digits of nonzero disparity into a group of $n$ digit, each group of $n$ digits which corresponds to a group of $m$ digits having nonzero disparity also corresponding to an alternative group of $m$ digits having a disparity of the same magnitude but opposite sign.

7. A method of transmitting binary-coded digital data including the steps of: transforming the data into a form having lower disparity by a method according to claim 3, transmitting the lower disparity data, and transforming the lower disparity data after transmission into its original form by a method including the step of removing the extra digit from the predetermined position in each group of zero disparity.

8. Apparatus for transforming a sequence of binary digits into a form having lower disparity comprising means for selecting successive groups of $n$ binary digits in the sequence, means for recoding each group of $n$ binary digits as a group of $m$ binary digits, where $m$ is greater than $n$, in such a way that some but not all of the groups of $m$ digits have minimum disparity and that each group of $n$ digits which is recoded as a group of $m$ digits having nonzero disparity is also recoded as an alternative group of $m$ digits having a disparity of the same magnitude but opposite sign, and means for selecting the groups so that successive groups of $m$ digits having nonzero disparity have disparities of opposite signs.

9. Apparatus according to claim 8, in which $m$ is even and ${}^{m}C_{m/2}$ is less than $2^n$ in which the means for recoding the selected group of $n$ binary digits as a group of $m$ binary digits is such that ${}^{m}C_{m/2}$ of the $2^n$ possible different groups of $n$ digits are recoded into different $m$ digit groups of zero disparity and the remaining different groups of $n$ digits are recoded as different $m$-digit groups having alternate positive and negative disparities.

10. Apparatus according to claim 9, in which $m = n + 1$ and the means for recoding a selected group of $n$ binary digits as a group of $m$ digits includes storage means for the selected group of $n$ binary digits, means for ascertaining the disparity of that group of digits, means responsive to unit disparity and for adding a generated digit to the selected group in a predetermined position, and means responsive to disparities greater than unity for enabling a translator to respond to the selected group of digits to produce a corresponding group of $m$ digits.

11. Apparatus according to claim 10, in which the translator includes means for producing for each group of $n$ digits having disparities greater than unity a corresponding group of $m$ digits, and the complement of that group, and means for selecting as the output either the group of $m$ digits or its complement in dependence upon the disparity of the last $m$-digit group output of the translator.

12. Apparatus according to claim 9, in which $n = 5$ and $m = 6$.

13. Apparatus for transforming into its original form a sequence of binary digits which has been transformed into a form having lower disparity by recoding successive groups of $n$ binary digits in the sequence as groups of $m$ binary digits, where $m$ is even and equals $n + 1$, and both are positive integers, the apparatus including:

- means for ascertaining the disparity of each of successive groups of $m$ digits and producing an indication if the group has zero disparity,
- means responsive to the indication to derive an $n$-digit group from that group of digits by extracting a digit from a predetermined position in that group, the arrangement being such as to transform into their original form ${}^{m}C_{m/2}$ of the $2^n$ possible different groups of $n$ digits recoded into different $m$ digit groups of zero disparity by the addition at the predetermined position of one extra digit of the appropriate type to produce zero disparity, and
- means responsive to $m$-digit groups of nonzero disparity to transform into their original form the remaining different groups of $n$ digits recoded as different $m$-digit groups of nonzero disparity, each group of $n$ digits which corresponds to a group of $m$ digits having nonzero disparity also corresponding to an alternative group of $m$ digits having a disparity of the same magnitude but opposite sign.

* * * * *